US008902781B2

(12) United States Patent
Xu

(10) Patent No.: US 8,902,781 B2
(45) Date of Patent: Dec. 2, 2014

(54) DEVICE AND METHOD FOR DYNAMICALLY CONFIGURING DISCONTINUOUS RECEPTION PARAMETERS

(75) Inventor: Haisheng Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 73 days.

(21) Appl. No.: 13/634,287

(22) PCT Filed: Apr. 14, 2011

(86) PCT No.: PCT/CN2011/072810
§ 371 (c)(1),
(2), (4) Date: Sep. 12, 2012

(87) PCT Pub. No.: WO2012/003732
PCT Pub. Date: Jan. 12, 2012

(65) Prior Publication Data
US 2013/0094379 A1 Apr. 18, 2013

(30) Foreign Application Priority Data
Jul. 6, 2010 (CN) .......................... 2010 1 0219907

(51) Int. Cl.
H04W 52/24 (2009.01)
H04W 52/02 (2009.01)
H04W 28/18 (2009.01)
H04W 76/04 (2009.01)

(52) U.S. Cl.
CPC .......... H04W 52/0209 (2013.01); H04W 28/18 (2013.01); H04W 52/0216 (2013.01); H04W 52/0261 (2013.01); H04W 76/048 (2013.01); Y02B 60/50 (2013.01)
USPC .......................................... 370/252; 370/311

(58) Field of Classification Search
None
See application file for complete search history.

(56) References Cited

U.S. PATENT DOCUMENTS

2004/0229639 A1* 11/2004 Meyers et al. ................. 455/522
2007/0291728 A1* 12/2007 Dalsgaard et al. ............ 370/347

(Continued)

FOREIGN PATENT DOCUMENTS

| CN | 101656978 A | 2/2010 |
| JP | 2009089404 A | 4/2009 |
| WO | 2007148198 A2 | 12/2007 |
| WO | 2010053330 A2 | 5/2010 |

OTHER PUBLICATIONS

Seoul, Korea: "Active mode DRX details", 3GPP TSG-RAN WGx Meeting #55, R2-062753, Oct. 13, 2006, [Online] URL: http:// www.3gpp.orgiftp/tsg_ran/WG2_RL2/TSGR2_55/Documents/R2-062753.zip, see paragraph 4 in Section 2, the last line of paragraph 2 in Section 3.1, paragraph 3 in Section 3.2.

(Continued)

Primary Examiner — Anh-Vu Ly
Assistant Examiner — Hashim Bhatti
(74) Attorney, Agent, or Firm — Stephen Yang; Ling Wu; Ling and Wang Intellectual Property

(57) ABSTRACT

The present invention provides a device and a method for dynamically configuring Discontinuous Reception parameters, and the method includes: when DRX parameters of a terminal need to be adjusted, the DRX parameters are adjusted until the terminal satisfies the requirement of the Guaranteed Bit Rate after the adjustment of DRX, and then the DRX parameters are no longer adjusted. Adopting the technical scheme of the present invention can make a base station adapt to the power-saving and performance requirement of the terminal in real time by a dynamic estimation of the DRX adjusted parameters of the terminal, in addition, it can also satisfy the requirement for the signaling load in different circumstances by configuring an adjusted cycle.

12 Claims, 4 Drawing Sheets

(56) References Cited

U.S. PATENT DOCUMENTS

| | | |
|---|---|---|
| 2008/0046132 A1 | 2/2008 | Dalsgaard et al. |
| 2009/0046641 A1 | 2/2009 | Wang et al. |
| 2009/0154385 A1* | 6/2009 | Makhija et al. ............... 370/311 |
| 2009/0180414 A1* | 7/2009 | Maeda et al. ................. 370/311 |
| 2009/0303927 A1* | 12/2009 | Kolding et al. ............... 370/328 |
| 2010/0110897 A1 | 5/2010 | Chun et al. |
| 2012/0014269 A1* | 1/2012 | Ray et al. ..................... 370/252 |

OTHER PUBLICATIONS

Seoul, Korea: "Adaptive DRX Setting for LTE paging", 3GPP TSG-RAN WG2#55, R2-062818, Oct. 13, 2006, [Online] URL: http://www.3gpp.org/ftp/tsg_ran/WG2_RL2TTSGR2_55/Documents/R2-062818.zip, see lines 1-16 of paragraph 5.

International Search Report for PCT/CN2011/072810 dated Jun. 30, 2011.

* cited by examiner

DEVICE AND METHOD FOR DYNAMICALLY CONFIGURING DISCONTINUOUS RECEPTION PARAMETERS

TECHNICAL FIELD

The present invention relates to the communication field, and in particular, to a method and device for dynamically configuring Discontinuous Reception (DRX) parameters.

BACKGROUND OF THE RELATED ART

In a Long Term Evolution system, a Discontinuous Reception (DRX) method is used in order to make a terminal save power as much as possible. The DRX may let the terminal in an active state as well as a sleeping state, and the terminal periodically wakes up to perform receptions and operations of a Physical Downlink Control Channel (PDCCH) rather than monitoring the Physical Downlink Control Channel in real time, so as to achieve the purpose of saving power. An evolved Node B (eNB) configures each DRX parameter of the terminal through Radio Resource Control (RRC) layer signaling, and the enhanced Node B and the terminal keep consistent in the DRX parameters. A Media Access Control (MAC) layer can also control the operations of the DRX via a control element (namely MAC CE). A smaller DRX cycle can guarantee scheduling opportunities of a terminal service in the time domain, but the ability to save power is sacrificed, while a larger DRX cycle configuration may not meet the harsh time delay requirement of some services of the terminal, so that the system performance is decreased. Therefore, the DRX parameters configured by the RRC layer are required to try to achieve a compromise between the power-saving and performance of the terminal. However, services of the different terminals have different demands for the DRX parameters.

SUMMARY OF THE INVENTION

The present invention provides a device and method for dynamically configuring Discontinuous Reception (DRX), which can adjust the DRX on the basis of taking into account the power-saving and performance of a terminal.

A method for dynamically configuring Discontinuous Reception (DRX), comprises:

when DRX parameters of a terminal need to be adjusted, adjusting the DRX parameters of the terminal until the terminal satisfies a requirement of Guaranteed Bit Rate (GBR) after adjustment of the DRX parameters, and no longer adjusting the DRX parameters.

The aforementioned method further has the following characteristic:

the step of adjusting the DRX parameters of the terminal comprises: decreasing a DRX cycle value in accordance with a configured step length.

The aforementioned method further has the following characteristic:

the configured step length is a fixed step length, alternatively a dynamic step length.

The aforementioned method further has the following characteristic:

the method further comprises: judging whether current DRX parameters need to be adjusted or not within an observation cycle, that is, whether a current terminal meets the requirement of Guaranteed Bit Rate or not.

The aforementioned method further has the following characteristic:

judging whether the current terminal meets the requirement of Guaranteed Bit Rate or not comprises: if an actual scheduling interval of the terminal is currently greater than a target scheduling interval, the requirement of Guaranteed Bit Rate is not satisfied.

The aforementioned method further has the following characteristic:

assuming that an initial offset value of current DRX is StartOffset, after adjusting the DRX, the method further comprises: calculating the initial offset value StartOffset according to a following formula:

StartOffset=StartOffset mod(longDRXCycle),mod for a remainder operation, and longDRXCycle for a value of configured long DRX cycle.

The aforementioned method further has the following characteristic:

assuming that the target scheduling interval is I_require and the number of scheduling opportunities of the terminal within a current DRX cycle is Np, if the terminal has not met the requirement of Guaranteed Bit Rate yet after adjusting the DRX N times, the method further comprises: determining a new adjusted initial cycle value in accordance with a following way:

assuming that I_MAX=I_require×Np, a smaller value between the I_MAX and the current DRX cycle value is taken as DRX1, and a maximum value less than DRX1 is selected from allowed DRX cycle values as an actual adjustment value of DRX cycle DRX2, and since an uplink and a downlink respectively correspond to a DRX2, a smaller DRX2 from the uplink and downlink is taken as the new adjusted initial cycle value, and then the new adjusted initial cycle value is taken as an initial value and the DRX is adjusted with the configured step length; the N is a preset threshold of continuous adjustment;

if a short DRX cycle is configured, a value of the short DRX cycle is adjusted, and if there is no short DRX cycle configured, a value of a long DRX cycle is adjusted.

The aforementioned method further has the following characteristic:

assuming that the target scheduling interval is I_require, the actual scheduling interval is I_real, the observation cycle is $T_{DRX}$, the number of times for scheduling the terminal within said $T_{DRX}$ is n, a transmission block size of scheduling the terminal each time is TB Size, m refers to GBR service types in an uplink or downlink direction, and p refers to non-GBR service types in the uplink or downlink direction;

$$TB_{everage} = \left(\sum_{i=0}^{n-1} TBSize_i\right)/n,$$

$$GBR_{UE} = \sum_{j=0}^{m-1} GBR_j + \sum_{k=0}^{p-1} PBR_k;$$

said I_require = $TB_{everage}/GBR_{UE}$, and I_real = $T_{DRX}/n$.

A device for dynamically configuring Discontinuous Reception (DRX) parameters, comprises a DRX parameter adjustment calculation unit:

the DRX parameter adjustment calculation unit is configured: to adjust the DRX parameters of the terminal when needing to adjust the DRX parameters of a terminal, until the terminal satisfies a requirement of Guaranteed Bit Rate (GBR) after adjustment.

The above device further has the following characteristic:

the DRX parameter adjustment calculation unit is configured to adjust the DRX parameters of the terminal in a following way:

decreasing a DRX cycle value in accordance with a configured step length.

The above device further has the following characteristic:

the configured step length is a fixed step, alternatively a dynamic step length.

The above device further has the following characteristic:

the device further comprises a DRX parameter adjustment judgment unit, the DRX parameter adjustment judgment unit is configured: to judge whether a current DRX parameter need to be adjusted within an observation cycle or not, that is, whether a current terminal meets the requirement of Guaranteed Bit Rate or not.

The above device further has the following characteristic:

the DRX parameter adjustment judgment unit is configured to judge whether the current terminal meets the requirement of Guaranteed Bit Rate as follows: if an actual scheduling interval of the terminal is currently greater than a target scheduling interval, the requirement of Guaranteed Bit Rate is not satisfied.

The above device further has the following characteristic:

the DRX parameter adjustment calculation unit is further configured to calculate an initial offset value StartOffset in accordance with a following formula after the DRX is adjusted each time:

StartOffset=StartOffset mod(longDRXCycle),mod for a remainder operation, and longDRXCycle for a value of configured long DRX cycle.

The above device further has the following characteristic:

assuming that the target scheduling interval is I_require and the number of scheduling opportunities of the terminal within a current DRX cycle is Np, if the terminal has not met the requirement of Guaranteed Bit Rate yet after adjusting the DRX N times, the DRX parameter adjustment calculation unit is further configured: to determine a new adjusted initial cycle value in accordance with a following way:

assuming that I_MAX=I_require×Np, a smaller value between the I_MAX and the current DRX is taken as DRX1, and a maximum value less than DRX1 is selected from allowed DRX values as an actual adjustment value of DRX cycle DRX2, and since an uplink and a downlink respectively correspond to a DRX2, a smaller DRX2 from the uplink and downlink is taken as the new adjusted initial cycle value, and then the new adjusted initial cycle value is taken as an initial value and the DRX is adjusted with the configured step length; the N is a preset threshold of continuous adjustment;

if a short DRX cycle is configured, a value e of the short DRX cycle is adjusted, and if there is no short DRX cycle configured, the value e of a long DRX cycle is adjusted.

The above device further has the following characteristic:

assuming that the target scheduling interval is I_require, the actual scheduling interval is I_real, the observation cycle is $T_{DRX}$, the number of times for scheduling the terminal within said $T_{DRX}$ is n, a transmission block size of scheduling the terminal each time is TB Size, m refers to GBR service types in an uplink or downlink direction, and p refers to non-GBR service types in the uplink or downlink direction;

$$TB_{everage} = \left(\sum_{i=0}^{n-1} TBSize_i\right) / n,$$

$$GBR_{UE} = \sum_{j=0}^{m-1} GBR_j + \sum_{k=0}^{p-1} PBR_k;$$

said I_require = $TB_{everage} / GBR_{UE}$, and I_real = $T_{DRX} / n$.

In summary, adopting the technical scheme of the present invention can make a base station adapt to the power-saving and performance requirement of the terminal in real time by a dynamic estimation of the DRX adjusted parameters of the terminal, in addition, it can also satisfy the requirement for the signaling load in different circumstances by configuring an adjusted cycle.

PREFERRED EMBODIMENTS OF THE PRESENT INVENTION

The present invention provides a method and a device for dynamically configuring Discontinuous Reception (DRX) parameters, so as to make the terminal achieve a good compromise between the power-saving and performance.

Figure 1:
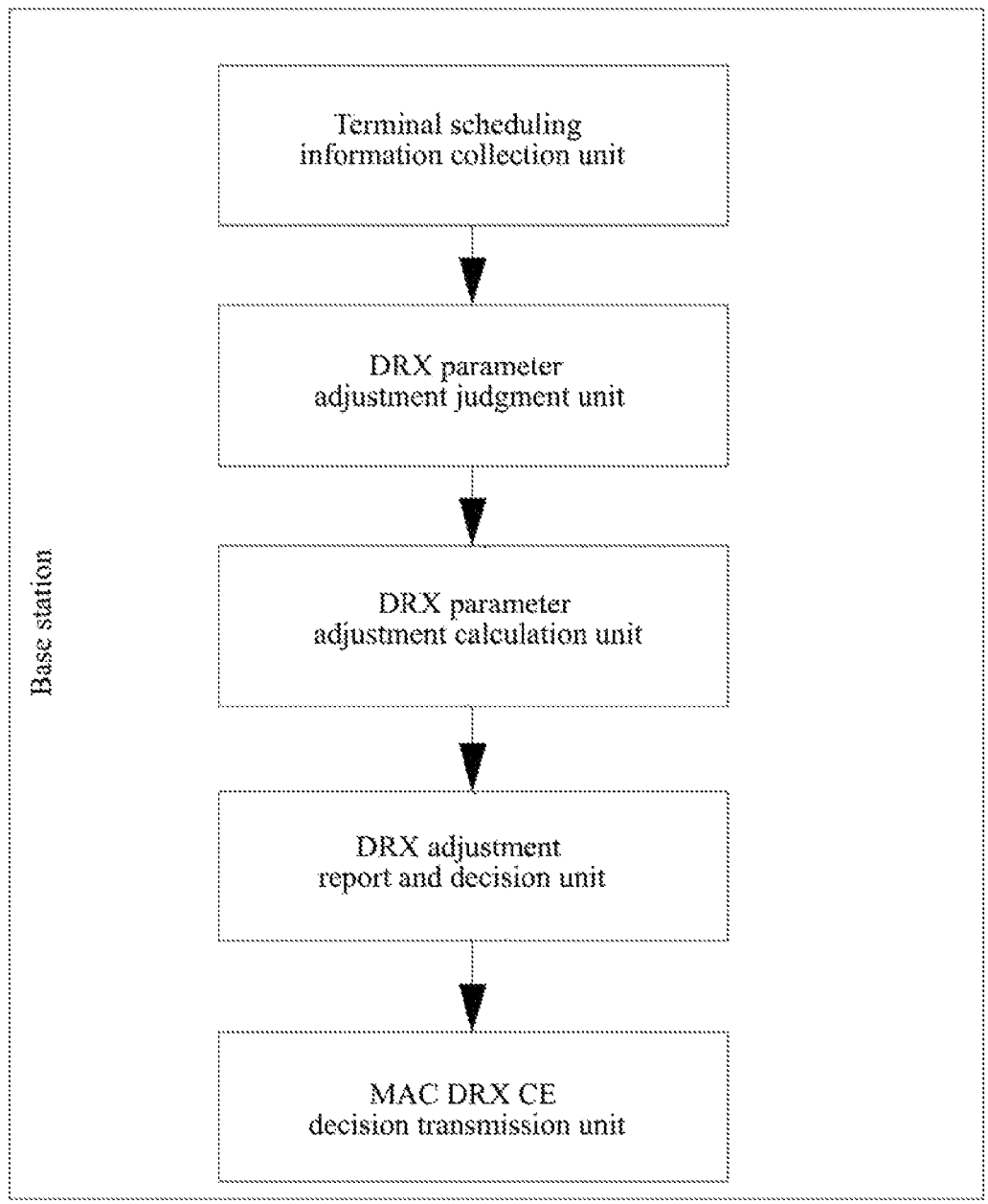
FIG. 1 is a structural diagram of a device for dynamically adjusting Discontinuous Reception (DRX) parameters in accordance with the present invention.

The embodiment provides a device for dynamically adjusting DRX parameters, and the device is located in a MAC layer of an eNB, and as shown in FIG. 1, the device comprises a terminal scheduling information collection unit, a DRX parameter adjustment judgment unit, a DRX parameter adjustment calculation unit, a DRX adjustment report and decision unit and a MAC DRX CE decision transmission unit.

The terminal scheduling information collection unit is used to collect the scheduling information of terminal, which comprises the number n of times for scheduling the terminal within the $T_{DRX}$, a transmission block size TB Size of scheduling the terminal each time, a Guaranteed Bit Rate (GBR) of some service of the terminal and a Prioritized Bit Rate (PBR) of some service of the terminal.

The DRX parameter adjustment judgment unit is used to judge whether the terminal configures the DRX or not, and if not, it is determined whether to need to configure the DRX in accordance with the scheduling information collected and calculated by the terminal scheduling information collection unit; if the terminal configures the DRX currently, it is judged whether to need to adjust the DRX, that is, it is judged whether the current terminal satisfies the requirement of Guaranteed Bit Rate or not; and the DRX parameter adjustment judgment unit is further used to transmit a judgment result to the DRX parameter adjustment calculation unit.

The DRX parameter adjustment calculation unit is used to adjust the DRX parameters of the terminal; specifically, the current DRX cycle value is decreased with a configured step length;

the DRX parameter adjustment calculation unit is further used to calculate the initial offset value StartOffset after adjusting the DRX parameters;

StartOffset=StartOffset mod(longDRXCycle), and longDRXCycle is a DRX cycle value of the configured long cycle;

assuming that the target scheduling interval is I_require and the number of scheduling opportunities of the terminal within the current DRX cycle is Np, and if the terminal has not met the requirement of Guaranteed Bit Rate yet after adjusting the DRX N times, the DRX parameter adjustment calculation unit is further configured to determine a new adjusted initial cycle value in accordance with the following way:

assuming that I_MAX=I_require×Np, a smaller value between the I_MAX and the current DRX cycle value is taken as DRX1, and the maximum value less than DRX1 is selected from the allowed DRX cycle values as the actual adjustment value of DRX cycle DRX2, and since the uplink and downlink respectively correspond to a DRX2, the smaller DRX2 between the uplink and downlink is taken as the new adjusted initial cycle value, and then the new adjusted initial cycle value is taken as an initial value and the DRX cycle value is adjusted with the configured step length;

the aforementioned N is a preset threshold of the continuous adjustment.

If DRX>=I_require after adjusting the DRX, the DRX parameter adjustment calculation unit is further used to transmit the adjusted DRX parameters as well as the StartOffset to the DRX adjustment report and decision unit.

The DRX adjustment report and decision unit is used to report the received DRX as well as the StartOffset to the RRC layer, to request a parameter adjustment.

The MAC DRX CE decision transmission unit is used to judge whether to need to apply the adjusted DRX on time or not, and to send the DRX as well as MAC DRX CE to the terminal when judging that it is necessary;

assuming that the target scheduling interval is I_require, the actual scheduling interval is I_real, the observation cycle is $T_{DRX}$, the number of times for scheduling the terminal within $T_{DRX}$ is n, a transmission block size of scheduling the terminal each time is TB Size, m refers to GBR service types in the uplink or downlink direction, and p refers to non-GBR service types in the uplink or downlink direction;

$$TB_{everage} = \left(\sum_{i=0}^{n-1} TBSize_i\right) / n,$$

$$GBR_{UE} = \sum_{j=0}^{m-1} GBR_j + \sum_{k=0}^{p-1} PBR_k;$$

I_require = $TB_{everage} / GBR_{UE}$, and I_real = $T_{DRX} / n$.

The embodiment provides a method for dynamically adjusting the DRX parameters, and it decreases the DRX cycle value of the terminal in accordance with the configured step length when needing to adjust the DRX parameters of the terminal, and if the terminal meets the requirement of Guaranteed Bit Rate after adjusting the DRX, the DRX is no longer adjusted.

For a LTE system, the cycle value currently configured by the DRX includes the long cycle longDRXCycle and the short cycle shortDRXCycle. If the DRX is configured, the default cycle configuration is the long cycle longDRXCycle, and the shortDRXCycle is an optional configuration. If the shortDRXCycle is configured, the configured longDRXCycle is an integer multiple of the shortDRXCycle; if the shortDRXCycle is configured, the DRX cycle value of the shortDRXCycle is adjusted each time, and if the shortDRXCycle is not configured, the DRX cycle value of the longDRXCycle is adjusted each time.

CRXCycle is defined as an available cycle value of the DRX, and the range of values complies with the 3GPP protocol.

The observation time of $T_{DRX}$ is configured, and the cycle time for re-calculation of the DRX parameters is configured to be M×$T_{DRX}$, wherein M is a positive integer.

Figure 2:
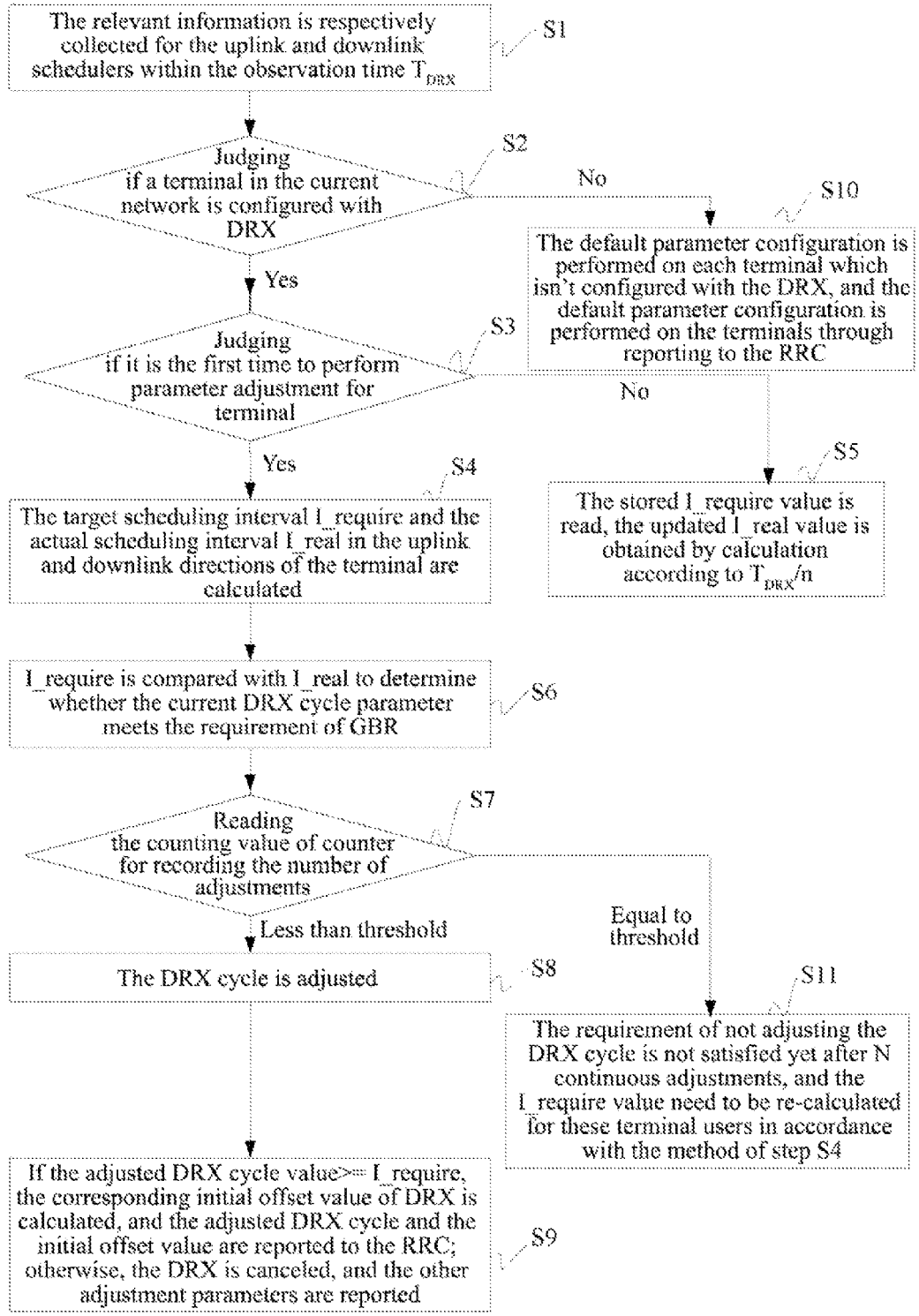
FIG. 2 is a flow chart of a method for dynamically adjusting Discontinuous Reception (DRX) parameters in accordance with the present invention.

Specifically, as shown in FIG. 2, the following steps are comprised.

In step S1, the following information is respectively collected for the uplink and downlink schedulers within the observation time $T_{DRX}$: the number n of times for scheduling the terminal within the $T_{DRX}$, the transmission block size of scheduling the terminal each time (denoted by TB Size), the Guaranteed Bit Rate (GBR) of some service of the terminal, and the Prioritized Bit Rate (PBR) of some service of the terminal; and the information is used to maintain each terminal in the uplink and downlink network respectively. In addition, an uplink and downlink time slot ratio (for frequency division duplex FDD, no uplink and downlink time slot ratio) and so on of time-division duplex (TDD) of the current cell also need to be acquired.

In step S2, it is judged whether the terminal in the current network is configured with the DRX or not, if not, skip to step S10, otherwise, proceed to step S3;

In step S3, it is judged whether it is the first time to perform the DRX parameter adjustment for the terminal, if yes, proceed to step S4, otherwise, skip to step S5;

the judgment whether it is the first parameter adjustment can be in accordance with a certain criterion. For example, a counter for recording the number of adjustments can be set, and if the counter is zero, it indicates the first adjustment, and if the counter is not zero, it indicates that it is not the first adjustment; one discarded clock can also be configured, and the number of adjustments within one clock cycle is recorded, and if the recorded number of adjustments is zero, it indicates the first adjustment, and if the recorded number of adjustments is not zero, it indicates that it is not the first adjustment, and the number of adjustments is recorded again when the next clock cycle arrives.

Of course, the present invention is not limited to the aforementioned description for the judgment whether to be the first adjustment.

In step S4, the target scheduling interval I_require as well as the actual scheduling interval I_real in the uplink direction of the terminal and the target scheduling interval I_require as well as the actual scheduling interval I_real in the downlink direction are calculated, and then skip to step S6.

The specific calculation method is:

assuming the acquired transmission block size TB Size in a certain direction (uplink or downlink) according to the observation time $T_{DRX}$ and the number of times for scheduling n, the statistical average $TB_{average}$ of the transmission block size is acquired, $$TB_{everage} = \left(\sum_{i=0}^{n-1} TBSize_i\right)/n;$$

and the equivalent GBR of the terminal is calculated, by means of GBR or PBR of each service of the terminal, for example $$GBR_{UE} = \sum_{j=0}^{m-1} GBR_j + \sum_{k=0}^{p-1} PBR_k,$$

m refers to GBR service types in the direction, and p refers to non-GBR service types in the direction;

I_require=$TB_{everage}$/$GBR_{UE}$, the value indicates that the maximum time interval of every two schedulings if the terminal needs to meet the requirement of GBR on the average significance, and the requirement of GBR is not satisfied if the scheduling interval when actually scheduling is greater than the value. The I_require calculated this time is stored.

I_real=$T_{DRX}$/n, I_real is the actual scheduling interval of the terminal.

In step S5, the stored I_require is read, the updated I_real value is obtained by calculating according to $T_{DRX}$/n, and then proceed to step S6.

In step S6, I_require is compared with I_real to determine whether the current DRX cycle parameter meets the requirement of GBR or not; if needing the adjustment, proceed to step S7, if not, return to step S5 when the next observation cycle arrives;

specifically, if I_require<I_real (that is the actual scheduling interval is greater than the minimum value of the theoretical requirement), the current cycle needs to be adjusted, otherwise, the current cycle is not adjusted.

The observation time $T_{DRX}$ should meet: the accuracy of the statistical requirement and the load requirement of RRC signaling. Therefore, the observation time should be at least in the level of one hundred milliseconds, that is the observation time should be greater than or equal to several hundred milliseconds.

In step S7, the counting value of the counter for recording the number of adjustments is read, and if the value of counter is equal to the preset threshold N, skip to step S11, if less than the preset threshold N, proceed to step S8.

In step S8, the DRX cycle is adjusted, and then proceed to step S9.

The adjustment method can decrease the DRX value with a certain step length, assuming that the step length is λ, the DRX cycle value defined in specifications includes m discrete values, which are sequentially recorded as T1, T2, . . . Tm in accordance with the order from small to large, and if the current DRX cycle value is Ti, the DRX cycle value is T (i–λ) after decreased by the step length λ; and the DRX value can also be decreased with the dynamic step length;

the counter for recording the number of adjustments increases by one.

In step S9, if the adjusted DRX cycle value (DRX Cycle)>=I_require, the corresponding initial offset value of DRX StartOffset is calculated, and then the adjusted DRX cycle as well as StartOffset are reported to the RRC; and then return to step S5 when the next observation time arrives.

If DRX Cycle<I_require, the DRX is canceled, that is, the DRX is Release; at the same time the other adjustment parameters are reported to the higher layer.

Figure 3:
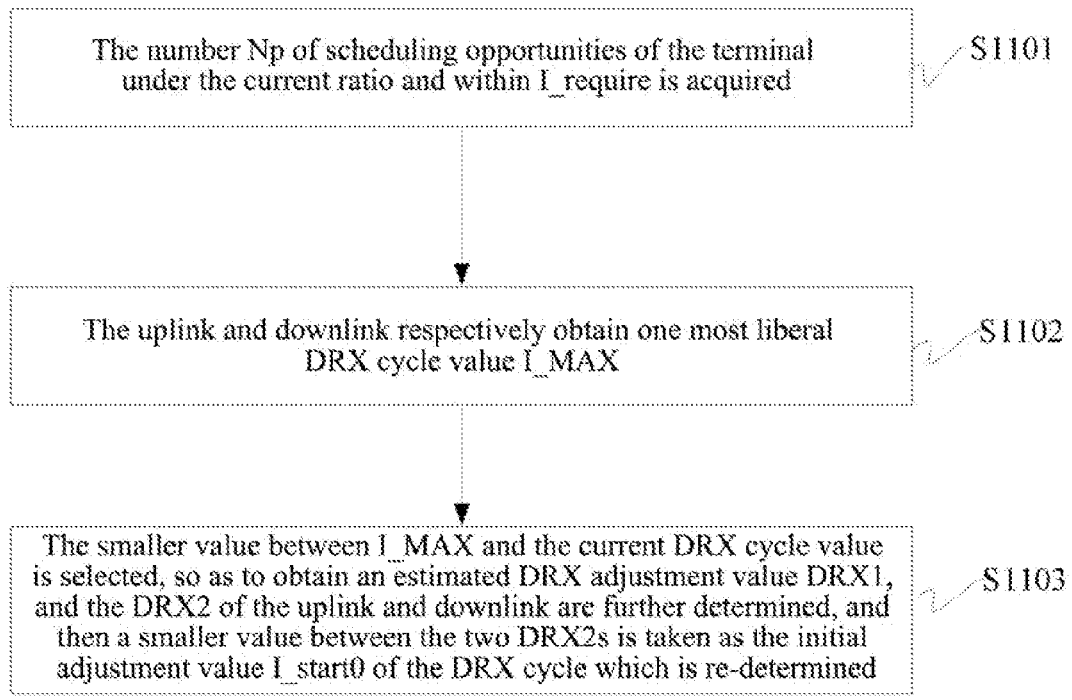
FIG. 3 is a process for calculating a DRX initial adjustment cycle in a DRX parameter calculation unit in a method and device for dynamically configuring Discontinuous Reception (DRX) parameters in accordance with the present invention.

The method for calculating the initial offset value StartOffset is as follows:

StartOffset=StartOffsetmod(longDRXCycle);

In step S10, the default parameter configuration is performed on each terminal which is not configured with the DRX, and the default parameter configuration is performed on the terminals through reporting to the RRC, and the default parameter configuration can be the longest DRX, such as 320 ms;

In step S11, the requirement of not adjusting the DRX cycle is not satisfied yet after N continuous adjustments, therefore the I_require value need to be re-calculated for these terminal users in accordance with the method of step S4. A new adjusted initial cycle value is determined according to the following steps after the calculation, and as shown in FIG. 3, the adjusted initial cycle value is the maximum DRX cycle value when the DRX is adjusted again.

In step S1101, for the TDD system, the number Np of scheduling opportunities of the terminal under the current ratio and within I_require is acquired according to the current ratio of the uplink and downlink of cell, and the uplink and downlink respectively correspond to one number of the opportunities, wherein the number of the uplink opportunities refers to the number of scheduling and authorization, and the number of downlink opportunities refers to the number of the downlink sub-frames (that is, each sub-frame may has the opportunity to be scheduled.)

For the FDD system, the number of the uplink opportunities and the number of the downlink opportunities are both fixed as Np=I_require.

In step S1102, the I_require is determined to be a most stringent DRX cycle value (the uplink and downlink respectively correspond to one value) needed by the terminal, and I_require is multiplied by Np, and then the uplink and downlink respectively obtain one most liberal DRX cycle value I_MAX, that is, I_MAX=I_require×Np.

In step S1103, the smaller value between I_MAX and the current DRX cycle value (that is the DRX cycle value after being adjusted N times) is selected, so as to obtain an estimated DRX adjustment value DRX1, and the DRX1 is not necessarily the one among m DRX cycle (DRXCycle) values allowed by the protocol, therefore the maximum DRX cycle value less than the DRX1 is selected from the allowed DRX cycle values to be taken as the adjusted value of the actual DRX cycle (denoted as DRX2); the uplink and downlink respectively correspond to one such DRX2, a smaller DRX2 between the uplink and the downlink is taken as the adjusted initial cycle value I_start0 of the DRX cycle which is determined again;

and then while adjusting, the adjustment begins from the DRX cycle value I_start0 with the step length λ, and the obtained DRX cycle is I_start.

If the modified parameters immediately need to take effect for the terminal according to a certain specific criterion or dynamic criterion, the MAC layer can transmit the MAC CE at the same time.

The First Embodiment

Figure 4:
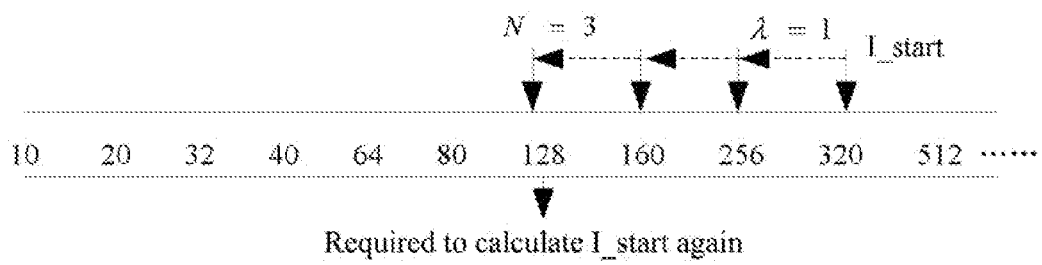
FIG. 4 is diagram of a DRX adjustment corresponding to the first embodiment of the present invention.

Assuming that the default DRX cycle in a cell is 320 ms and there is only a long cycle, furthermore assuming that the TDD ratio used by the cell is 1. If a terminal accesses the network to be in a state of RRC_CONNECTED, the base station side performs the default parameter configuration on the terminal, that is the DRX long cycle is 320 ms, and it is assumed that the DRX startOffset of the UE is equal to 314. GBR=256 Kbps when the UE performs a certain kind of on-demand video service. FIG. 4 is a diagram of the DRX adjustment of the embodiment, and the process to perform the dynamic adjustment of the DRX parameters for the UE is as follows.

In step 101, the scheduling information collection unit executes the information collection for the transmission block size (TB Size) of scheduling the terminal, the number n of times for scheduling the terminal within $T_{DRX}$ and the Guaranteed Bit Rate (GBR) of terminal service, in addition the TDD ratio of the current cell is read, and the ratio is 1 if for FDD. Let the collected $T_{DRX}$=500 ms, n=10.

In step 102, let the terminal be the first adjustment after configuring the DRX, and the adjustment calculation unit will calculate the average of the TB Size according to the TB Size and the number of times for scheduling n:

$$TB_{everage} = \left(\sum_{i=0}^{n-1} TBSize_i\right) / n.$$

The equivalent GBR value of the terminal is calculated, $$GBR_{UE} = \sum_{j=0}^{m-1} GBR_j.$$

The target scheduling interval of the terminal is calculated: I_require=$TB_{everage}$/$GBR_{UE}$, assuming that $TB_{everage}$=10240 bit, it is obtained through calculation that I_require=40 ms, I_real of the terminal is calculated to be $I_{real}$=$T_{DRX}$/n=50 ms.

In step 103, the adjustment judgment unit will judge whether the terminal can adjust the DRX parameters or not: if I_require<I_real, the current cycle needs to be adjusted. The value of I_require is stored, and the value of I_real is updated every cycle hereinafter.

In step 104, the current cycle is 320 ms, the number of the downlink sub-frames within I_require is 24, and it is calculated that I_MAX=min (320 ms, 40 ms*24)=320 ms. The corresponding I_start0 is found to be 320 ms from each enumeration value of the DRX cycle. Making the adjustment step length λ=1, the adjustment calculation unit needs to decrease the terminal cycle by the step length λ, to obtain the corresponding cycle: 256 ms for FDD, and for TDD, this value should be taken from multiples of 10 to 250 ms. At this time I_start=250 ms. The corresponding StartOffset is calculated, StartOffset=StartOffset mod (I_start)=314 mod 250=74.

In step 105, at this time I_start>=I_require is met, and the decision report unit reports the above parameter values to the RRC to request the parameter adjustment.

In step 106, according to a certain criterion, the MAC CE decision transmission unit performs a transmission of the MAC CE if requiring the parameters to take effect immediately.

In step 107, the judgment and adjustment is continued every $T_{DRX}$. If the requirement of GBR is not satisfied yet after the adjustment threshold N=3 is reached, the I_require is required to be calculated again according to step 102 at this time.

The Second Embodiment

Figure 5:
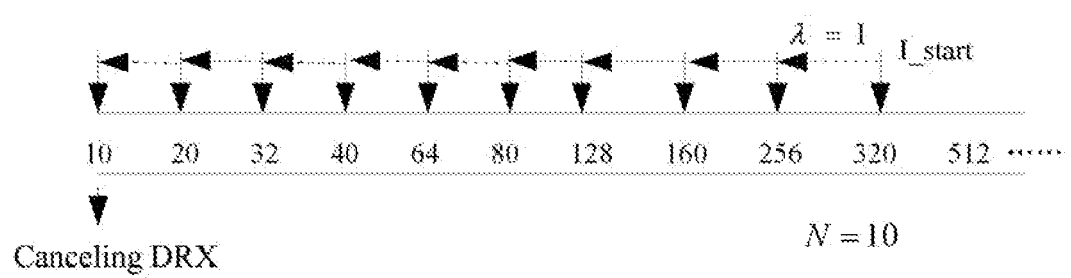
FIG. 5 is diagram of a DRX adjustment corresponding to the second embodiment of the present invention.

Assuming that the default DRX cycle in a cell is 320 ms and there is only a long cycle, furthermore assuming that the TDD ratio used by the cell is 1. If a terminal accesses the network to be in a state of RRC_CONNECTED, the base station side performs the default parameter configuration on the terminal, that is the DRX long cycle is 320 ms, and it is assumed that the DRX startOffset of the UE is equal to 314. GBR=247.8 Kbps when the UE performs a certain kind of on-demand video service, and at the same time, a voice call with GBR=12.2 Kbps is performed. FIG. 5 is a diagram of the DRX adjustment of the embodiment, and the process to perform the dynamic adjustment of the DRX parameters for the UE is as follows.

In step 201, the scheduling information collection unit executes information collection for the transmission block size (TB Size) of scheduling the terminal, the number n of times for scheduling the terminal within $T_{DRX}$ and the Guaranteed Bit Rate (GBR) of terminal service, in addition the TDD ratio of the current cell is read, and the ratio is 1 if for FDD. Let the collected $T_{DRX}$=500 ms, n=10 for the uplink, and n=25 for the downlink.

In step 202, assuming that it is the first adjustment for the UE,
 the calculation for the downlink is:
 the average of the TB size is $$TB_{everage} = \left(\sum_{i=0}^{n-1} TBSize_i\right) / n,$$

assuming that $TB_{everage}$=10240 bit. The equivalent GBR value of the terminal is calculated, $$GBR_{UE} = \sum_{j=0}^{m-1} GBR_j = 247.8 + 12.2 = 256 \text{ (Kbps)},$$

it is obtained through the calculation of the downlink that I_require=$TB_{everage}$/$GBR_{UE}$=40 ms, and the I_real of the terminal is calculated to be I_real=$T_{DRX}$/n=50 ms.
 The calculation for the uplink is:
 the average of the TB size is $$TB_{everage} = \left(\sum_{i=0}^{n-1} TBSize_i\right) / n,$$

assuming that $TB_{everage}$=488 bit. The equivalent GBR value of the terminal is calculated, $$GBR_{UE} = \sum_{j=0}^{m-1} GBR_j = 12.2 \text{ (Kbps)},$$

it is obtained through calculation for the uplink that I_require=$TB_{everage}$/$GBR_{UE}$=40 ms, and the I_real of the terminal is calculated to be I_real=$T_{DRX}$/n=20 ms.

In step 203, the adjustment judgment unit will judge whether the terminal can adjust the DRX parameters or not: I_require<I_real for the downlink, and I_require>I_real for the uplink. If the downlink does not meet the requirement of GBR, the current cycle needs to be adjusted. The value of I_require is stored, and the value of I_real is updated every cycle hereinafter.

In step 204, the current cycle is 320 ms, the number of the downlink sub-frames within cycle is 24, and it is calculated for downlink that I_MAX=min (320 ms, 40 ms*24)=320 ms. The corresponding I_start0 is found to be 320 ms from each enumeration value of the DRX cycle. Making the adjustment step length λ=1, the adjustment calculation unit needs to decrease the terminal cycle by the step length λ, to obtain the corresponding cycle: 256 ms for FDD, and for TDD, this value should be taken from multiples of 10 to 250 ms. At this time I_start=250 ms. The corresponding StartOffset is calculated, StartOffset=StartOffset mod (I_start)=314 mod 250=74.

In step 205, at this time I_start>=I_require is met, and the decision report unit reports the above parameter values to the RRC to request the parameter adjustment.

In step 206, according to a certain criterion, the MAC CE decision transmission unit performs a transmission of the MAC CE if requiring the parameters to take effect immediately.

In step 207, let the adjustment threshold N=10, and it is assumed that the requirement of GBR is not satisfied yet after seven adjustments in the embodiment. And I_start=32 ms<I_require=40 ms at this time. The decision report unit is notified to report to the higher layer to stop the DRX, that is, the DRX is Release.

Those skilled in the technical field should understand that all or parts of steps of the aforementioned method can be completed by programs instructing the corresponding hardware, and the programs can be stored in a computer readable storage medium, such as a read-only memory, a magnetic disk or a CD-ROM and so on. Alternatively, all or parts of steps of the aforementioned embodiments can be implemented with one or more integrated circuits. Correspondingly, each module or unit in the above embodiments can be implemented in the form of hardware as well as software functional modules. The present invention is not limited to any specific forms of combinations of hardware and software.

INDUSTRIAL APPLICABILITY

Adopting the technical scheme of the present invention can make a base station adapt to the power-saving and performance requirement of the terminal in real time by a dynamic estimation of the DRX adjusted parameters of the terminal, in addition, it can also satisfy the requirement for the signaling load in different circumstances by configuring an adjusted cycle.

What is claimed is:

1. A method for dynamically configuring Discontinuous Reception (DRX) parameters, comprising:
when the DRX parameters of a terminal need to be adjusted, adjusting the DRX parameters of the terminal until the terminal satisfies a requirement of Guaranteed Bit Rate (GBR) after adjustment of the DRX parameters, and no longer adjusting the DRX parameters;
wherein the method further comprises: judging whether current DRX parameters need to be adjusted within an observation cycle, that is, whether the terminal currently meets the requirement of the GBR or not;
wherein the step of judging whether the terminal currently meets the requirement of the GBR or not comprises: if an actual scheduling interval of the terminal is currently greater than a target scheduling interval, not satisfying the requirement of the GBR.

2. The method of claim 1, wherein the step of adjusting the DRX parameters of the terminal comprises:
decreasing a DRX cycle value in accordance with a configured step length.

3. The method of claim 2, wherein the configured step length is a fixed step length, alternatively a dynamic step length.

4. The method of claim 2, wherein,
assuming that an initial offset value of current DRX is StartOffset, after adjusting the DRX each time, the method further comprises: calculating the initial offset value StartOffset according to a following formula:

StartOffset=StartOffset mod(longDRXCycle),mod represents a remainder operation, and longDRX-Cycle represents a value of configured long DRX cycle.

5. The method of claim 4, wherein,
assuming that a target scheduling interval is I_require and the number of scheduling opportunities of the terminal within a current DRX cycle is Np, if the terminal has not met the requirement of the GBR yet after adjusting the DRX for N times, the method further comprises: determining a new adjusted initial cycle value in accordance with a following way:
assuming that I_MAX=I_require×Np, taking a smaller value between the I_MAX and the current DRX cycle value as DRX1, and selecting a maximum value less than the DRX1 from allowed DRX cycle values as an actual adjustment value of DRX cycle DRX2, and since an uplink and a downlink respectively correspond to a DRX2, taking a smaller DRX2 from the uplink and downlink as the new adjusted initial cycle value, and then taking the new adjusted initial cycle value as an initial value and adjusting the DRX with the configured step length; the N being a preset threshold of continuous adjustment;
if a short DRX cycle is configured, adjusting a value of the short DRX cycle, and if there is no short DRX cycle configured, adjusting a value of the long DRX cycle.

6. The method of claim 1, wherein,
assuming that the target scheduling interval is I_require, the actual scheduling interval is I_real, the observation cycle is $T_{DRX}$, the number of times for scheduling the terminal within said $T_{DRX}$ is n, a transmission block size of scheduling the terminal each time is TB Size, m refers to GBR service types in an uplink or downlink direction and p refers to non-GBR service types in an uplink or downlink direction;

$$TB_{everage} = \left(\sum_{i=0}^{n-1} TBSize_i\right)/n,$$

$$GBR_{UE} = \sum_{j=0}^{m-1} GBR_j \sum_{k=0}^{p-1} PBR_k +;$$

said I_require = $TB_{everage}/GBR_{UE}$, and I_real = $T_{DRX}/n$.

7. A device for dynamically configuring Discontinuous Reception (DRX) parameters, comprising:
a DRX parameter adjustment calculation unit and a DRX parameter adjustment judgment unit;
wherein the DRX parameter adjustment calculation unit is configured: to adjust the DRX parameters of a terminal when needing to adjust the DRX parameters of the terminal, until the terminal satisfies a requirement of Guaranteed Bit Rate (GBR) after adjustment;

the DRX parameter adjustment judgment unit is configured: to judge whether a current DRX parameter need to be adjusted within an observation cycle, that is, whether the terminal currently meets the requirement of the GBR or not;

wherein the DRX parameter adjustment judgment unit is configured to judge whether the terminal currently meets the requirement of the GBR as follows: if an actual scheduling interval of the terminal is currently greater than a target scheduling interval, not satisfying the requirement of the GBR.

8. The device of claim 7, wherein the DRX parameter adjustment calculation unit is configured to adjust the DRX parameters of the terminal in a following way:

decreasing a DRX cycle value in accordance with a configured step length.

9. The device of claim 8, wherein the configured step length is a fixed step length, alternatively a dynamic step length.

10. The device of claim 7, wherein, the DRX parameter adjustment calculation unit is further configured to calculate an initial offset value StartOffset in accordance with a following formula after the DRX is adjusted each time:

StartOffset=StartOffset mod(longDRXCycle), mod represents a remainder operation, and longDRX-Cycle represents a value of configured long DRX cycle.

11. The device of claim 10, wherein, assuming that a target scheduling interval is I_require and the number of scheduling opportunities of the terminal within a current DRX cycle is Np, if the terminal has not met the requirement of the GBR yet after adjusting the DRX for N times, the DRX parameter adjustment calculation unit is further configured: to determine a new adjusted initial cycle value in accordance with a following way:

assuming that I_MAX=I_require×Np, taking a smaller value between the I_MAX and current DRX as DRX1, and selecting a maximum value less than the DRX1 from allowed DRX values as an actual adjustment value of DRX cycle DRX2, and since an uplink and a downlink respectively correspond to a DRX2, taking a smaller DRX2 from the uplink and downlink as the new adjusted initial cycle value, and then taking the new adjusted initial cycle value as an initial value and adjusting the DRX with a configured step length; the N being a preset threshold of continuous adjustment;

if a short DRX cycle is configured, adjusting a value e of the short DRX cycle, and if there is no short DRX cycle configured, adjusting a value e of the long DRX cycle.

12. The device of claim 7, wherein, assuming that the target scheduling interval is I_require, the actual scheduling interval is I_real, the observation cycle is $T_{DRX}$, the number of times for scheduling the terminal within said $T_{DRX}$ is n, a transmission block size of scheduling the terminal each time is TB Size, m refers to GBR service types in an uplink or downlink direction and p refers to non-GBR service types in an uplink or downlink direction;

$$TB_{everage} = \left(\sum_{i=0}^{n-1} TBSize_i\right) / n,$$

$$GBR_{UE} = \sum_{j=0}^{m-1} GBR_j \sum_{k=0}^{p-1} PBR_k +;$$

said I_require = $TB_{everage} / GBR_{UE}$, and I_real = $T_{DRX} / n$.

* * * * *